United States Patent [19]

Snyder

[11] Patent Number: 5,422,914
[45] Date of Patent: Jun. 6, 1995

[54] SYSTEM AND METHOD FOR SYNCHRONIZING DATA COMMUNICATIONS BETWEEN TWO DEVICES OPERATING AT DIFFERENT CLOCK FREQUENCIES

[75] Inventor: Michael D. Snyder, Austin, Tex.

[73] Assignee: Motorola, Inc., Schaumburg, Ill.

[21] Appl. No.: 117,278

[22] Filed: Sep. 7, 1993

[51] Int. Cl.[6] .............................................. H04L 7/00
[52] U.S. Cl. .................. 375/354; 370/100.1
[58] Field of Search ................ 375/106, 107, 113, 7, 375/8; 370/100.1, 103, 85.1; 340/825.14, 825.2; 377/48; 328/63, 74, 25; 307/269

[56] References Cited

U.S. PATENT DOCUMENTS 4,412,342 10/1983 Khan et al. .......................... 375/107
4,845,437 7/1989 Mansur et al. ...................... 375/106

Primary Examiner—Stephen Chin
Assistant Examiner—Timothy J. May
Attorney, Agent, or Firm—Lee E. Chastain

[57] ABSTRACT

A data synchronization system (12) for use with a first and a second device has control circuitry (34), first circuitry (36, 38, 40, 42 and 44) and second circuitry (32). The control circuitry generates a first and a second control signal. The logic states of the two control signals depend upon the ratio of the clock frequencies of the two devices. The first circuitry receives a first data signal from the first device and generates a first output signal for the second device depending upon the logic state of the first control signal. Conversely, the second circuitry receives a second data signal from the second device and generates a second output signal for the first device depending upon the logic state of the second control signal. The synchronization system may be incorporated into data processing systems in which the data processor and bus operate at different clock frequencies.

12 Claims, 5 Drawing Sheets

FIG.5

SYSTEM AND METHOD FOR SYNCHRONIZING DATA COMMUNICATIONS BETWEEN TWO DEVICES OPERATING AT DIFFERENT CLOCK FREQUENCIES

FIELD OF THE INVENTION

The present invention generally relates to data processing systems, and more specifically to a data synchronization methodology for use with a data processing system.

BACKGROUND OF THE INVENTION

Many data processing systems are designed with subsystems that operate at different clock frequencies. This strategy can increase overall processing throughput by increasing the operating speed of select subsystems relative to the remaining subsystems. Typically, the performance of these faster subsystems is either critical to the overall performance of the system or relatively inexpensive to increase. One example of this design strategy is a data processing system with a single VLSI (very large scale integrated) data processor operating at a clock frequency some multiple times the clock frequency of an associated bus. In this case, all other subsystems in the data processing system operate at the lower bus clock speed. Generally, the ratio of the two clock frequencies may be expressed as the ratio of two integers: 2:1, 3:2, 4:1, etc. The range of these ratios reflects the pragmatic requirement that the two clock signals have some frequent phase alignment in which to synchronize inter-system communications. The more frequent the phase alignment, the greater the number of opportunities to transfer data between the fast data processor and the slower bus.

Data processing systems that have a data processor operating at a different clock frequency than an associated bus must synchronize data transfer between the data processor and the bus. For instance, in a 2:1 processor-bus system, it may be the case that the data processor does not assert an output signal during the correct phase of the bus signal if the data processor only asserts the signal for one processor clock cycle. Conversely, the bus will assert an input signal to the data processor for two processor clock cycles. Both of these scenarios result in unreliable data transfers. In the first case, data may not be transferred from the data processor to the bus at all. In the second case, the bus will transfer the same data twice to the data processor.

Known synchronization methods have limitations. In general, data transfer methods may be described as asynchronous or synchronous. Each of these methods has a different synchronizing problem.

In the asynchronous case, there are no timing requirements between two communicating subsystems other than minimum signal hold times. In one known solution, a slow output signal is sampled by a fast input device through a series of sequential latching elements. The clocking signal of the faster input device clocks each of the latching elements. Each successive latching element reduces the probability that a metastable state will be passed from the slower device to the faster device. Unfortunately, each additional latch increases the propagation time from subsystem to subsystem by an additional fast clock cycle.

In the synchronous case, there are timing requirements between the two communicating subsystems. In particular, a signal must be asserted during a particular phase of the clock signal of the receiving device. In a second known solution, a single latching element-multiplexer circuit links two subsystems operating at different clock frequencies. The latching element samples the output of the multiplexer coincident with each fast clock cycle. The multiplexer outputs either a previously latched value or an input signal. The output of the multiplexer is selected by a control signal such that it passes each input signal according to the timing constraints of the receiving subsystem. This solution is suitable only where the ratio of the two clock frequencies is an integer. In addition, a particular solution is typically only valid for one processor to bus clock ratio.

SUMMARY OF THE INVENTION

In accordance with the present invention, there is disclosed a data synchronization system for synchronizing data communications between two devices operating at different clock frequencies which substantially eliminates disadvantages of prior synchronization systems.

A data synchronization system for use with a first and a second device has control circuitry, first circuitry and second circuitry. The control circuitry generates a first and a second control signal. The first and second control signals are characterized by a period. The period equals a quotient of the integer N and the frequency of the first device, where the ratio of the clock frequencies of the first and second device may be expressed as N:M in simplest form. The first control signal has either a first or a second logic state. The first control signal corresponds to the first logic state during a first fractional portion of the period and to the second logic state during a second fractional portion of the period. The second fractional portion is subsequent to the first fractional portion. The first fractional portion of the period equals a ratio of $(N-1):N$. The second fractional portion of the period equals a ratio of $1:N$. The second control signal has either a third or a fourth logic state. The second control signal corresponds to the third logic state during a third fractional portion of the period and to the fourth logic state during a fourth fractional portion of the period. The fourth fractional portion is subsequent to the third fractional portion. The third fractional portion equals a ratio of $1:N$. The fourth fractional portion equals a ratio of $(N-1):N$. The first circuitry receives a first data signal from the first device and generates a first output signal for the second device during the second logic state. Conversely, the second circuitry receives a second data signal from the second device and generates a second output signal for the first device during the third logic state of the second control signal.

In addition, a method for synchronizing data transfers between a data processor and a bus has the steps of generating a first control signal, generating a second control signal, generating a first data signal, outputting the first data signal to the bus, receiving a second data signal from the bus, and inputting the first data signal to the data processor. The steps of generating a first and a second control signal generate a first and second control signal, respectively, characterized by a period. The period equals a quotient of the integer N and the frequency of the data processor, where the ratio of the clock frequencies of the data processor and the bus may be expressed as N:M in simplest form. The first control signal has either a first or a second logic state. The first control signal corresponds to the first logic state during a first fractional portion of the period and to the second logic state during a second fractional portion of the period. The second fractional portion is subsequent to the first fractional portion. The first fractional portion of the period equals a ratio of (N−1):N. The second fractional portion of the period equals a ratio of 1:N. The second control signal has either a third or a fourth logic state. The second control signal corresponds to the third logic state during a third fractional portion of the period and to the fourth logic state during a fourth fractional portion of the period. The fourth fractional portion is subsequent to the third fractional portion. The third fractional portion equals a ratio of 1:N. The fourth fractional portion equals a ratio of (N−1):N. The step of outputting generates an output signal during the second logic state. The step of inputting inputs a signal during the third logic state.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
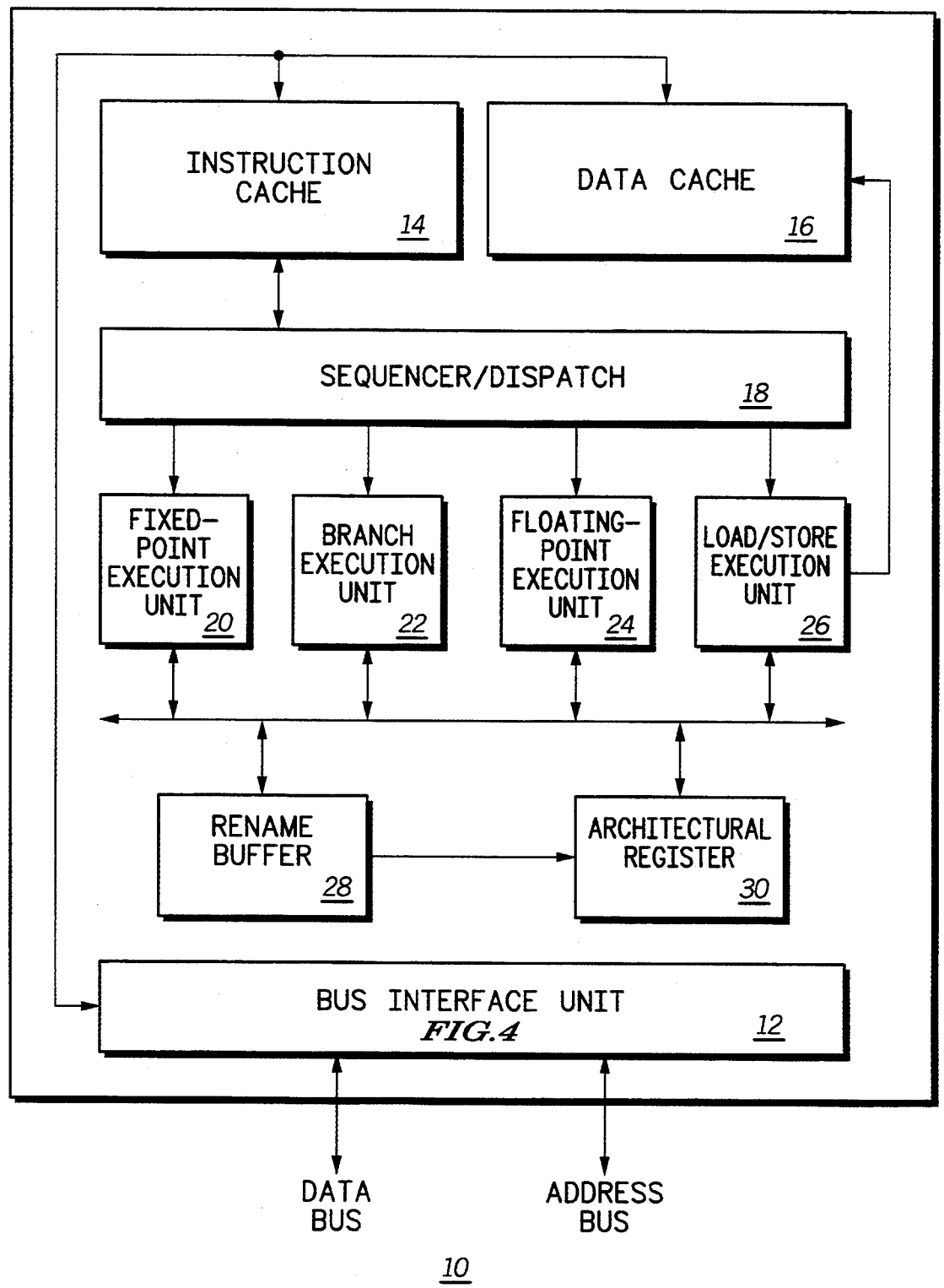
FIG. 1 depicts a block diagram of a data processor constructed in accordance with the present invention.

FIG. 1 depicts a block diagram of a data processor 10 constructed in accordance with the present invention. As depicted, data processor 10 has a bus interface unit 12 (hereafter simply BIU). BIU 12 controls the flow of data between data processor 12 and the address and data buses. Data processor 10 and BIU 12 operate at a clock speed greater than the clock speed of the address and data buses. As described above in the Background of the Invention, this clocking scheme improves the performance of a data processing system incorporating data processor 10. B IU 12 generates a PASS/$\overline{\text{MASK}}$ and a LATCH/$\overline{\text{FORWARD}}$ control signal which BIU 12 uses to synchronize data it receives from and outputs to the address and data buses. These signals and the hardware that uses them insure that exactly one signal is transmitted from data processor 10 to the address and data buses and vice versa. BIU 12 may also use the two control signals to synchronize internal data transfers between different portions of data processor 10.

BIU 12 is connected to an instruction cache 14 and to a data cache 16. Instruction cache 14 supplies an instruction stream to sequencer/dispatch unit 18. Sequencer/dispatch unit 18 forwards individual instructions to an appropriate execution unit block. Data processor 10 has a fixed point execution unit 20, a branch execution unit 22, a floating point execution unit 24, and a load/store execution unit 26. These execution unit blocks are connected to a rename buffer 28 and to architectural register file 30.

The operation of data processor 10 without the disclosed synchronization method and system therefor is known in the art. In general, sequencer/dispatch unit 18 issues individual instructions to the various execution units 20, 22, 24 and 26. Each of the execution units performs one or more instructions of a particular class of instructions. The particular class of instructions of each execution unit is indicated by the name of the execution unit. For instance, branch execution unit 22 executes branch instructions. Execution unit blocks 20, 22, 24 and 26 return the results of their operations to designated entries in rename buffer 28. Rename buffer 28 updates the values in architectural register file 30 according to a known protocol not relevant to the present invention. Rename buffer 28 and architectural register file 30 supplies operands to execution unit blocks 20 through 26.

The operation of data processor 10 with a data synchronization method and system therefor is described below in connection with FIGS. 2 through 6. In general, data processor 10 and the address and data buses follow a communications protocol that allows data communications without any synchronizing methods or systems at a 1:1 data processor clock frequency to bus clock frequency. For instance, a signal asserted on either bus during a particular phase of the bus clock for a particular duration will be properly latched by data processor 10 at the occurrence of the next particular edge transition when the data processor and bus operate at the same frequency. In addition, data processor 10 and the address and data buses follow a "handshake" communications protocol. A handshake communications protocol is one in which any clock cycle of a protocol participant can be used for any type of data protocol operation. A set of logic signals asserted on a set of control signals between the protocol participants determines which operation if any takes place during each clock cycle. The particular protocol is not part of the disclosed invention. It is generally advantageous to operate data processor 10 at as high a clock frequency as possible. However, it may not be economical or even possible to operate the address and data buses at the same high clock frequency. The disclosed data synchronization system may be incorporated in such a system.

Figure 2:
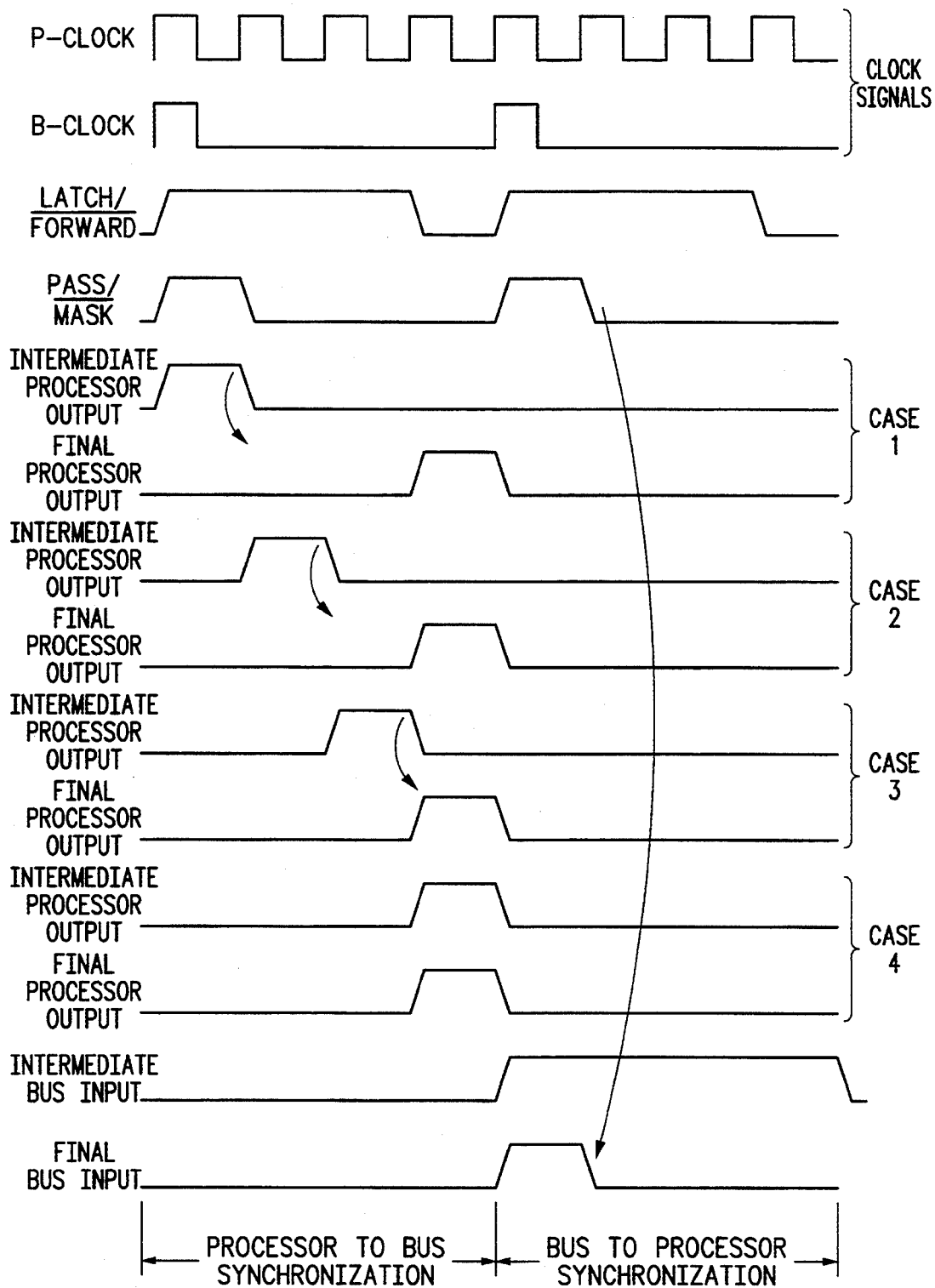
FIG. 2 depicts a timing diagram of a set of control signals operable to implement the disclosed invention in a first configuration.

FIG. 2 depicts a timing diagram of a set of control signals operable to implement the disclosed invention in a first configuration. In this first configuration, the ratio of the frequency of the processor clock (P-CLOCK) to the frequency of the address and data bus clock (B-CLOCK) is 4:1. It should be understood that FIG. 2 is one particular illustration of a first class of configurations of the disclosed invention. The first class of configurations includes those embodiments in which the ratio of the frequency of the P-CLOCK to the B-CLOCK is an integer number. The fifth through twelfth logic traces depict four separate cases. It should be understood that no more than one of the four cases would occur in any given B-CLOCK cycle. In each of these four cases, an INTERMEDIATE PROCESSOR OUTPUT signal from data processor 10 is synchronized with the B-CLOCK, forming a FINAL PROCESSOR OUTPUT signal. The FINAL PROCESSOR OUTPUT signal is output to the address or data bus as appropriate or to circuits clocked by the B-CLOCK. In the thirteenth and fourteenth logic traces, an INTERMEDIATE BUS INPUT signal from the address or data bus is synchronized to the P-CLOCK. The FINAL BUS INPUT signal is input to data processor 10.

Continuing with FIG. 2, BIU 12 internally generates two control signals LATCH/FORWARD and PASS/MASK. Both of these control signals have a frequency equal to the quotient of (1) the clock frequency of the slower of the two communicating devices (the address and data buses), and (2) M, or the quotient of (1) the clock frequency of the faster of the two communicating devices (data processor 10), and (2) N, where the ratio of the clock frequency of the faster device (P-CLOCK) to the clock frequency of the slower device (B-CLOCK) may be expressed in simplest form as N:M, where N and M are integers. A ratio is in simplest form if the greatest common integer factor of the numerator and the denominator is one. For instance, the ratios 2:1 and 4:1 are in simplest form. The ratios 4:2 and 8:2, however, are not in simplest form. The numerator and denominator in both of these two latter ratios may be divided by two. Conversely, the period of the signals LATCH/FORWARD and PASS/MASK may be expressed as the quotient of (1) M and (2) the clock frequency of the slower of the two communicating devices, or the quotient of (1) N and (2) the clock frequency of the faster of the two communicating devices.

There are N cycles of the faster device (P-CLOCK) and M cycles of the slower device (B-CLOCK) in a group of clock signal cycles. A group of clock signal cycles begins on a set of coincident edges of the P-CLOCK and the B-CLOCK and ends on the next set of the same coincident clock edges. In the depicted embodiment, a group of clock signal cycles begins when the two clock signals transition to a high logic state and ends when the two clock signals next transition to a high logic state. FIG. 2 depicts two groups of clock signal cycles.

The control signal LATCH/FORWARD synchronizes signals that are generated by data processor 10 or clocked by the P-CLOCK and outputs them to the address and data buses or to circuits clocked by the B-CLOCK. In the illustrated logic scheme, the signal LATCH/FORWARD is asserted for the first (N−1) cycles of each group of N cycles of the P-CLOCK. In general, the signal LATCH/FORWARD is asserted for a fractional portion of its period equal to (N−1):N. While asserted, the control signal LATCH/FORWARD causes BIU 12 to simultaneously latch the INTERMEDIATE PROCESSOR signal and screen the INTERMEDIATE PROCESSOR OUTPUT signal from the address and data buses. The signal LATCH/FORWARD is de-asserted during the last or Nth cycle of each group of N cycles of the P-CLOCK. In general, the signal LATCH/FORWARD is de-asserted for a fractional portion of its period equal to 1:N. While de-asserted, the control signal LATCH/FORWARD causes BIU 12 to pass a previously stored INTERMEDIATE PROCESSOR OUTPUT signal to the address or data buses, as the FINAL PROCESSOR OUTPUT signal. In the embodiment described below, BIU 12 also passes the INTERMEDIATE PROCESSOR OUTPUT signal generated during the Nth clock cycle of each group of N cycles to the address or data bus as it forwards any signal stored during the (N−1) previous clock cycles of the P-CLOCK. This method ensures that BIU 12 outputs the appropriate signal prior to the next rising edge of the B-CLOCK. This signal may be output on either the address or data bus as appropriate to the context of the signal.

Figure 4:
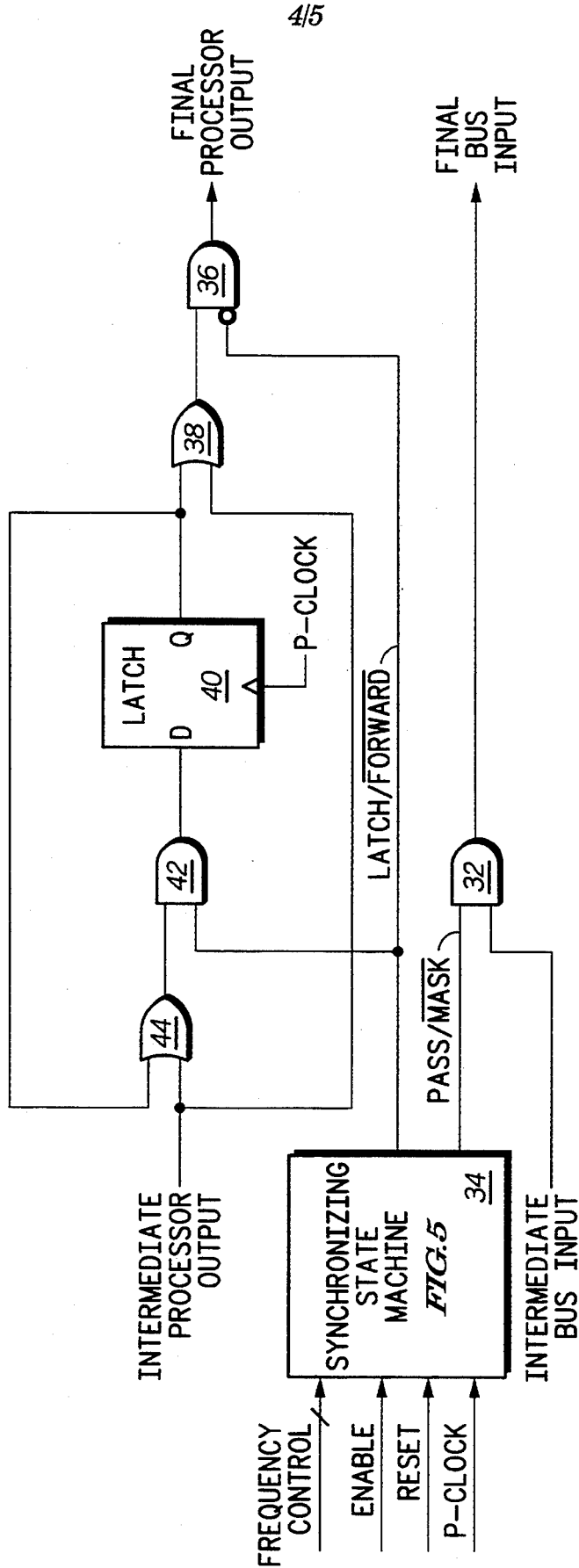
FIG. 4 depicts a block diagram of a portion of the bus interface unit block depicted in FIG. 1.

Cases one through four depicted in FIG. 2 illustrate the four different timing relationships that may exist between the INTERMEDIATE PROCESSOR OUTPUT signal and the B-CLOCK when the ratio N:M equals 4:1. Data processor 10 may generate an INTERMEDIATE PROCESSOR OUTPUT signal during any one of the four P-CLOCK cycles occurring for each B-CLOCK. In each of the first three cases, BIU 12 latches the INTERMEDIATE PROCESSOR OUTPUT signal (corresponding to a high logic state) when the signal occurs. Only during the fourth or final P-CLOCK cycle does BIU 12 forwards its latched signal to the address or data bus. In the fourth case, BIU 12 forwards the INTERMEDIATE PROCESSOR OUTPUT signal directly to the address or data bus as the FINAL PROCESSOR OUTPUT signal. In this fourth case, BIU 12 does not latch the INTERMEDIATE PROCESSOR OUTPUT signal. A circuit operable to perform the above described functions is depicted in FIG. 4.

The control signal PASS/MASK synchronizes signals that are communicated by the address and data buses and input to data processor 10. In the illustrated logic scheme, the signal PASS/MASK is asserted for the first cycle of each group of N cycles of the P-CLOCK. In general, the signal PASS/MASK is asserted for a fractional portion of its period equal to 1:N. While asserted, the control signal PASS/MASK causes BIU 12 to pass an INTERMEDIATE BUS INPUT signal to data processor 10, as the FINAL BUS INPUT signal. The signal PASS/MASK is de-asserted for every other P-CLOCK cycle in the group of N P-CLOCK cycles. In general, the signal PASS/MASK is de-asserted for a fractional portion of its period equal to (N−1):N. While de-asserted, the control signal PASS/MASK causes BIU 12 to mask the INTERMEDIATE BUS INPUT signal from data processor 10. The bottom two logic traces depict the single timing relationship that exists between an INTERMEDIATE BUS INPUT signal and the P-CLOCK and the resulting FINAL BUS INPUT signal.

Figure 3:
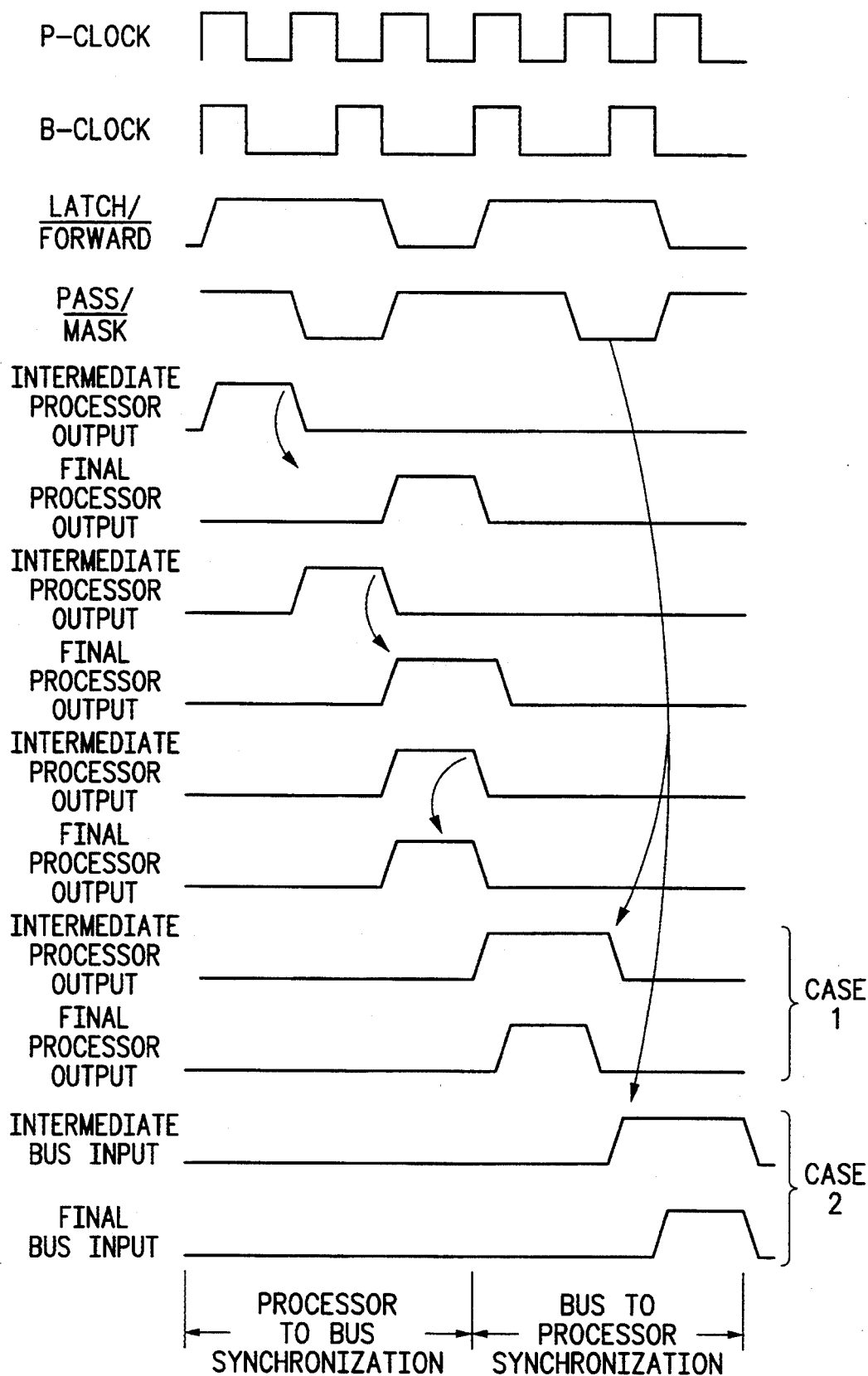
FIG. 3 depicts a timing diagram of a set of control signals operable to implement the disclosed invention in a second configuration.

FIG. 3 depicts a timing diagram of a set of control signals operable to implement the disclosed invention in a second configuration. In this second configuration, the ratio of the frequency of the processor clock (P-CLOCK) to the frequency of the address and data bus clock (B-CLOCK) is 3:2 in simplest form. It should be understood that FIG. 3 is one particular illustration of a second class of configurations of the disclosed invention. The second class of configurations includes those embodiments in which the ratio of the frequency of the P-CLOCK to the B-CLOCK is not an integer number. The particular ratio 3:2 is illustrated in FIG. 3 because it is the simplest non-integer configuration.

The fifth through tenth logic traces depict the operation of the LATCH/FORWARD signal in three separate processor-to-bus cases. In FIG. 3, N equals three. Therefore, there are only three possible timing relationships between the INTERMEDIATE PROCESSOR OUTPUT signal and the B-CLOCK. These three cases are similar to the first, second, and fourth cases, respectively, depicted in the top portion of FIG. 2.

In the second class of configurations, there is at least one other B-CLOCK cycle in each group of P-CLOCK cycles, and hence, one other opportunity for the slower device to forward a signal to the faster device. The Mth B-CLOCK cycle of M B-CLOCK cycles may be synchronized with the Nth P-CLOCK cycle of N P-CLOCK cycles. BIU 12 will pass a bus input signal to data processor 10 during the Mth B-CLOCK cycle by asserting the PASS/$\overline{\text{MASK}}$ signal during the Nth cycle of the P-CLOCK. In general, the signal PASS/$\overline{\text{MASK}}$ is asserted for a fractional portion of its period equal to 1:N, is de-asserted for a fractional portion of its period equal to (N−2):N, and re-asserted for a fractional portion of its period equal to 1:N in this second configuration.

The two possible timing relationships between the INTERMEDIATE BUS INPUT signal and the P-CLOCK are labeled case 1 and case 2, respectively in FIG. 3. The first of these two cases is identical to the single PASS/$\overline{\text{MASK}}$ case described in connection with FIG. 2. In the second case, the INTERMEDIATE BUS INPUT signal is asserted during the second half of the second P-CLOCK cycle and during the entire third cycle of the P-CLOCK. BIU 12 may see twice a single bus signal that straddles two P-CLOCK cycles. Therefore, the PASS/$\overline{\text{MASK}}$ signal is de-asserted during the second half of the second P-CLOCK cycle. This masking ensures that the INTERMEDIATE BUS INPUT signal occurs during a single P-CLOCK cycle.

FIG. 4 depicts a block diagram of a portion of BIU 12 depicted in FIG. 1. BIU 12 is designed to work with a communications protocol in which an active signal corresponds to a logic level one. One practiced in the art of digital circuit design, in conjunction with the following description, may modify BIU 12 such that it works with a communications protocol in which an active signal corresponds to a logic level zero. BIU 12 receives the INTERMEDIATE PROCESSOR OUTPUT signal from data and instruction cache blocks 14 and 16 and the INTERMEDIATE BUS INPUT signal from the address or data buses. BIU 12 generates the FINAL PROCESSOR OUTPUT signal and communicates it to the address or data bus, as appropriate to the context of the signal. BIU 12 also generates the FINAL BUS INPUT signal which it passes to data cache 14 or instruction cache 16. It should be understood that FIG. 4 depicts a circuit for synchronizing a single data bit signal between two devices. If data processor 10 was implemented with a sixty-four bit address-data bus combination, then BIU 12 would have sixty-four circuits similar to the circuit depicted in FIG. 4. (Certain devices in FIG. 4 may be shared between the sixty-four hypothetical circuits.)

BIU 12 receives the control signals FREQUENCY CONTROL, RESET, ENABLE, and the processor clocking signal P-CLOCK. The control signal FREQUENCY CONTROL indicates the ratio of the frequency of the P-CLOCK to the frequency of the B-CLOCK in simplest form. In the depicted embodiment, BIU 12 supports ratios of 1:1, 3:2, 2:1, 3:1 and 4:1. The control signal RESET is asserted by a device connected to data processor 10 to reset the operation of a system incorporating data processor 10. BIU 12 generates the ENABLE signal following the assertion of the RESET signal when a predetermined edge of the P-CLOCK and a predetermined edge of the B-CLOCK coincide. In the depicted embodiment, BIU 12 asserts ENABLE when the rising edge of the P-CLOCK and the B-CLOCK are aligned. BIU 12 continues to assert ENABLE until RESET is asserted a subsequent time.

An output of an AND gate 32 generates the FINAL BUS INPUT signal and passes the signal on to instruction cache 14 or data cache 16 as appropriate to the context of the signal. A first input of AND gate 32 receives the INTERMEDIATE BUS INPUT signal from the address or data bus. A second input of AND gate 32 receives the PASS/$\overline{\text{MASK}}$ signal. A state machine 34 generates the PASS/$\overline{\text{MASK}}$ signal and the LATCH/$\overline{\text{FORWARD}}$ signal described above. State machine 34 receives the control signals FREQUENCY CONTROL, ENABLE, RESET and the clocking signal P-CLOCK. BIU 12 may be implemented with combinatorial logic circuit that is a function of P-CLOCK and B-CLOCK in place of the depicted state machine. A state machine is used in the depicted embodiment to allow BIU 12 to be more thoroughly tested.

An output of an AND gate 36 generates the FINAL PROCESSOR OUTPUT signal and passes the signal on to the address bus or data bus 16 as appropriate to the context of the signal. An input of AND gate 36 is connected to the output of an OR gate 38. An inverting input of AND gate 36 receives the LATCH/$\overline{\text{FORWARD}}$ signal. A first input of OR gate 38 is connected to the output of a master-slave latch 40. A second input of OR gate 38 receives the INTERMEDIATE PROCESSOR OUTPUT signal. An input of master-slave latch 40 is connected to an output of an AND gate 42. Master-slave latch 40 is clocked by the P-CLOCK signal. A first input of AND gate 42 is connected to an output of an OR gate 44. A second input of AND gate 42 receives the LATCH/$\overline{\text{FORWARD}}$ signal. A first input of OR gate 44 receives the output of master-slave latch 40. A second input of OR gate 44 receives the INTERMEDIATE PROCESSOR OUTPUT signal.

During a processor to bus operation, BIU 12 may assert an INTERMEDIATE PROCESSOR OUTPUT signal during any of the N P-CLOCK cycles in each group of N P-CLOCK cycles. As indicated above, an assertion corresponds to a logic one. Master-slave latch 40 will latch any asserted INTERMEDIATE PROCESSOR OUTPUT signal except a signal asserted in the Nth cycle. AND gate 36 will forward the latched INTERMEDIATE PROCESSOR OUTPUT signal and the INTERMEDIATE PROCESSOR OUTPUT signal of the Nth P-CLOCK cycle when the LATCH/$\overline{\text{FORWARD}}$ signal is de-asserted.

During a bus to processor operation, the address or data buses may assert an INTERMEDIATE BUS INPUT signal during any of the N cycles of the N P-CLOCK cycles in each group of N P-CLOCK cycles. As indicated above, an assertion corresponds to a logic one. AND gate 32 will pass the INTERMEDIATE BUS INPUT signal only during the first or Nth P-CLOCK cycle, when the signal PASS/$\overline{\text{MASK}}$ is asserted.

Figure 5:
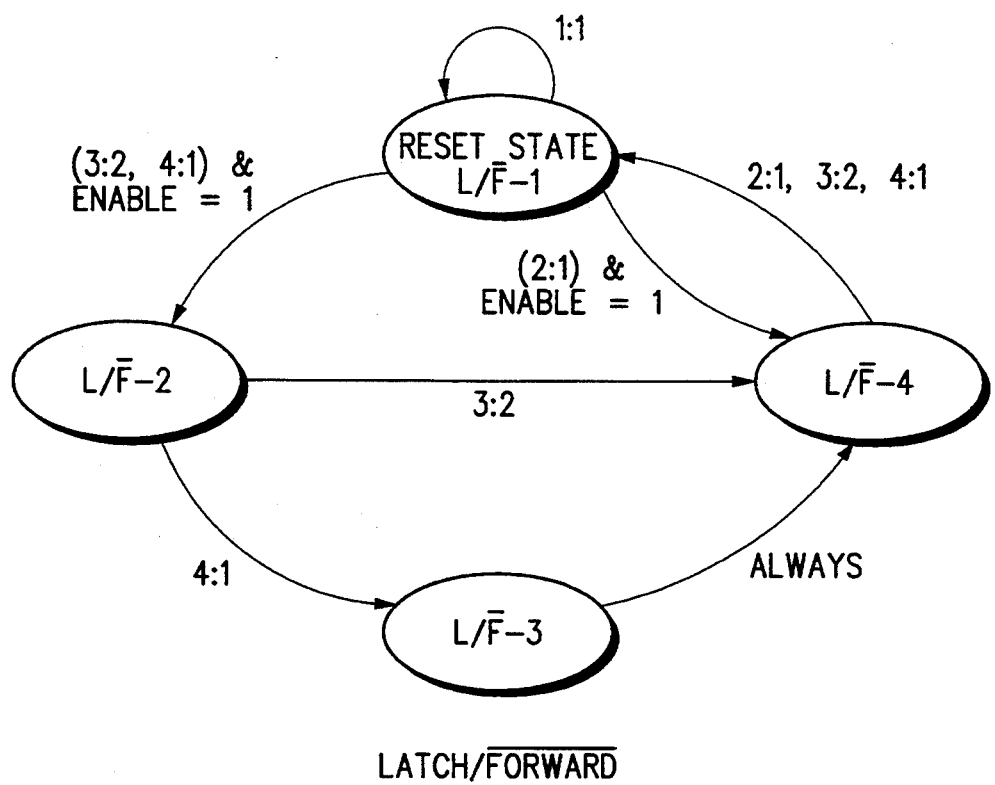
FIGS. 5 and 6 depict two state-transition diagrams illustrating the operation of the synchronization state machine depicted in FIG. 4.
Figure 6:
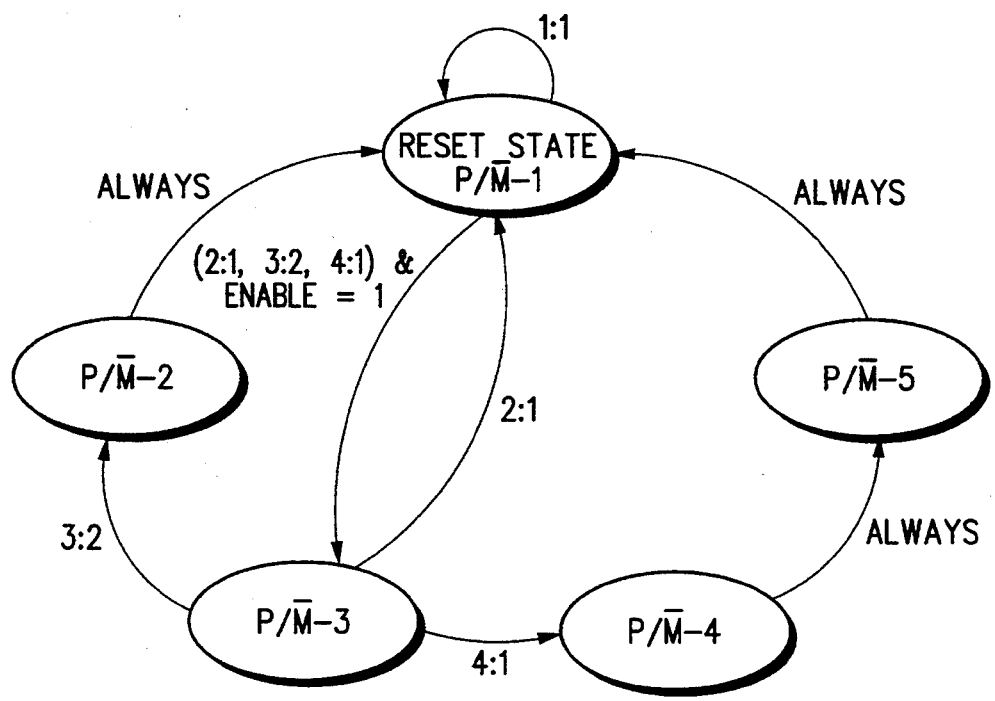

FIGS. 5 and 6 depict two state-transition diagrams illustrating the operation of the synchronization state machine 34 depicted in FIG. 4. Synchronization state machine 34 executes these two state-transition diagrams simultaneously and independently of one another. In the depicted state-transition diagrams, the ratio of the frequency of the P-CLOCK to the frequency of the B-CLOCK may be 1:1, 2:1, 3:2 and 4:1. One skilled in the art of digital circuit design, in conjunction with the following description, may extend the design of synchronization state machine 34 to support other frequency ratios.

The control signal LATCH/$\overline{\text{FORWARD}}$ may be asserted or de-asserted during a particular P-CLOCK cycle depending upon the states depicted in FIG. 5 and upon the ratio of the frequency of the P-CLOCK to the frequency of the B-CLOCK, in simplest form. The state of synchronization state machine 34 during a particular P-CLOCK cycle, in turn, is a function of the control signals depicted in FIG. 4 during the preceding P-CLOCK cycle and of the state of synchronization state machine 34 during the preceding P-CLOCK cycle. Synchronization state machine 34 has four states associated with the generation of the control signal $\overline{\text{LATCH/FORWARD}}$, labeled L/$\overline{\text{F}}$−1, L/$\overline{\text{F}}$−2, L/$\overline{\text{F}}$−3 and L/$\overline{\text{F}}$−4. Synchronization state machine 34 asserts the control signal $\overline{\text{LATCH/FORWARD}}$ when it is in any one of states L/$\overline{\text{F}}$−2 or L/$\overline{\text{F}}$−3. Synchronization state machine 34 asserts the control signal $\overline{\text{LATCH/FORWARD}}$ when it is in state L/$\overline{\text{F}}$−1 and when it is in the 3:2, 2:1 or 4:1 clock ratio mode. Synchronization state machine 34 de-asserts the control signal $\overline{\text{LATCH/FORWARD}}$ when it is in state L/$\overline{\text{F}}$−1 and when it is in the 1:1 clock ratio mode or when it is in state L/$\overline{\text{F}}$−4.

Synchronization state machine 34 resets to state L/$\overline{\text{F}}$−1 after the assertion of the control signal RESET. At each subsequent P-CLOCK cycle, state machine 34 attempts to change to an adjacent state. Synchronization state machine 34 changes from state L/$\overline{\text{F}}$−1 to state L/$\overline{\text{F}}$−2 if the control signal ENABLE is asserted and if data processor 10 is in the 3:2 or 4:1 mode. Synchronization state machine 34 changes from state L/$\overline{\text{F}}$−1 to state L/$\overline{\text{F}}$−4 if the control signal ENABLE is asserted and if data processor 10 is in the 2:1 mode. Synchronization state machine 34 remains in state L/$\overline{\text{F}}$−1 if data processor 10 is in the 1:1 mode. Synchronization state machine 34 changes from state L/$\overline{\text{F}}$−2 to state L/$\overline{\text{F}}$−4 if data processor 10 is in the 3:2 mode. Synchronization state machine 34 changes from state L/$\overline{\text{F}}$−2 to state L/$\overline{\text{F}}$−3 if data processor 10 is in the 4:1 mode. Synchronization state machine 34 changes from state L/$\overline{\text{F}}$−3 to state L/$\overline{\text{F}}$−4 in the next cycle of the P-CLOCK. Synchronization state machine 34 changes from state L/$\overline{\text{F}}$−4 to state L/$\overline{\text{F}}$−1 if data processor 10 is in the 2:1, 3:2 or 4:1 mode.

The control signal $\overline{\text{PASS/MASK}}$ may be asserted or de-asserted during a particular P-CLOCK cycle depending upon the states depicted in FIG. 6. The state of synchronization state machine 34 during a particular P-CLOCK cycle, in turn, is a function of the control signals depicted in FIG. 4 during the preceding P-CLOCK cycle and of the state of state machine 34 during the preceding P-CLOCK cycle. Synchronization state machine 34 has five states associated with the generation of the control signal $\overline{\text{PASS/MASK}}$, labeled P/$\overline{\text{M}}$−1, P/$\overline{\text{M}}$−2, P/$\overline{\text{M}}$−3, P/$\overline{\text{M}}$−4 and P/$\overline{\text{M}}$−5. Synchronization state machine 34 asserts the control signal $\overline{\text{PASS/MASK}}$ when it is in either state P/$\overline{\text{M}}$−1 or P/$\overline{\text{M}}$−2. Conversely, synchronization state machine 34 de-asserts the control signal $\overline{\text{PASS/MASK}}$ when it is in any one of states P/$\overline{\text{M}}$−3, P/$\overline{\text{M}}$−4, or P/$\overline{\text{M}}$−5.

Synchronization state machine 34 resets to state P/$\overline{\text{M}}$−1 after the assertion of the control signal RESET. At each subsequent P-CLOCK cycle, synchronization state machine 34 attempts to change to an adjacent state. Synchronization state machine 34 changes from state P/$\overline{\text{M}}$−1 to state P/$\overline{\text{M}}$−3 if the control signal ENABLE is asserted and if data processor 10 is in the 2:1, 3:2 or 4:1 mode. Synchronization state machine 34 remains in state P/$\overline{\text{M}}$−1 if data processor 10 is in the 1:1 mode. Synchronization state machine 34 changes from state P/$\overline{\text{M}}$−3 to state P/$\overline{\text{M}}$−2 if data processor 10 is in the 3:2 mode. Synchronization state machine 34 changes from state P/$\overline{\text{M}}$−2 to state P/$\overline{\text{M}}$−1 in the next cycle of the P-CLOCK. Synchronization state machine 34 changes from state P/$\overline{\text{M}}$−3 to state P/$\overline{\text{M}}$−1 if data processor 10 is in the 2:1 mode. Synchronization state machine 34 changes from state P/$\overline{\text{M}}$−3 to state P/$\overline{\text{M}}$−4 if data processor 10 is in the 4:1 mode. Synchronization state machine 34 changes from state P/$\overline{\text{M}}$−4 to state P/$\overline{\text{M}}$−5 in the next cycle of the P-CLOCK. Synchronization state machine 34 changes from state P/$\overline{\text{M}}$−5 to state P/$\overline{\text{M}}$−1 in the next cycle of the P-CLOCK.

Although the present invention has been described with reference to a specific embodiment, further modifications and improvements will occur to those skilled in the art. For instance, the disclosed invention is described as an integrated portion of a data processor. However, the disclosed invention can be implemented as part of the address or data bus or as a stand alone device. Therefore, the claims shall recite a data synchronization system operating between two devices. It is to be understood therefore, that the invention encompasses all such modifications that do not depart from the spirit and scope of the invention as defined in the appended claims.

What is claimed is:

1. A data synchronization system coordinating an exchange of data between a first device and a second device each operating at a different clock frequency to the first device operating at a first frequency, the second device operating at a second frequency, the first frequency greater than the second frequency, a ratio of the first frequency to the second frequency equal to a ratio of N to M in simplest form, where N and M are integers, the system comprising:

control circuitry for receiving a first clock signal, the first clock signal operating at the first frequency, the control circuitry generating a first control signal and a second control signal, the first and second control signals characterized by a period, the period equal to a quotient of the integer N to the first frequency, the first control signal comprising either a first or a second logic state, the first control signal corresponding to the first logic state during a first portion of the period and to the second logic state during a second portion of the period, the second portion subsequent to the first portion, the first portion equal to (N−1) divided by the first frequency., the second portion equal to one divided by the first frequency, the second control signal comprising either a third or a fourth logic state, the second control signal corresponding to the third logic state during a third portion of the period and to the fourth logic state during a fourth portion of the period, the fourth portion subsequent to the third portion, the third portion equal to one divided by the first frequency, the fourth portion equal to (N−1) divided by the first frequency;

first circuitry coupled to the control circuitry and receiving the first control signal, the first circuitry receiving a first data signal from the first device to be transferred to the second device, the first circuitry passing the first data signal to the second device during the second portion of the period; and second circuitry coupled to the control circuitry and receiving the second control signal, the second circuitry receiving a second data signal from the second device to be transferred to the first device, the second circuitry passing the second data signal to the first device during the third portion of the period.

2. The data synchronization system of claim 1 wherein the first circuitry comprises:
   latching circuitry for storing the first data signal received during the first portion of the period, the latching circuitry generating a previously stored first data signal; and
   forwarding circuitry coupled to the latching circuitry, the forwarding circuitry passing a second output signal during the second portion of the period, the first output signal is a logical result of an OR function of the previously stored first data signal and the first data signal received during the second portion of the period.

3. The data synchronization system of claim 2 wherein the control circuitry further comprises circuitry for generating the second control signal, the second control signal corresponding to the third logic state during a fifth and a sixth portion of the period and to the fourth logic state during a seventh portion of the period when the ratio of N to M is a non-integer value, the sixth portion subsequent to the seventh portion, the seventh portion subsequent to the fifth portion, the fifth and sixth portions equal to one divided by the first frequency, the sixth portion equal to $(N-2)$ divided by the first frequency.

4. The data synchronization system of claim 1 wherein the control circuitry further comprises circuitry for generating the second control signal, the second control signal corresponding to the third logic state during a fifth and a sixth portion of the period and to the fourth logic state during a seventh portion of the period when the ratio of N to M is a non-integer value, the sixth portion subsequent to the seventh portion, the seventh portion subsequent to the fifth portion, the fifth and sixth portions equal to one divided by the first frequency, the sixth portion equal to $(N-2)$ divided by the first frequency.

5. A data processor operating at a first periodic clock frequency, the data processor coupled to a bus operating at a second periodic clock frequency, the first periodic clock frequency greater than the second periodic clock frequency, a ratio of the first periodic clock frequency to the second periodic clock frequency equal to a ratio of N to M in simplest form, where N and M are integers, the data processor comprising:
   control circuitry for receiving the first periodic clock signal, the control circuitry generating a first control signal and a second control signal, the first and second control signals characterized by a period, the period equal to a quotient of the integer N to the first periodic clock frequency, the first control signal comprising either a first or a second logic state, the first control signal corresponding to the first logic state during a first portion of the period and to the second logic state during a second portion of the period, the second portion subsequent to the first portion, the first portion equal to $(N-1)$ divided by the first periodic clock frequency, the second portion equal to one divided by the first periodic clock frequency, the second control signal comprising either a third or a fourth logic state, the second control signal corresponding to the third logic state during a third portion of the period and to the fourth logic state during a fourth portion of the period, the fourth portion subsequent to the third portion, the third portion equal to one divided by the first periodic clock frequency, the fourth portion equal to $(N-1)$ divided by the first periodic clock frequency;
   first circuitry coupled to the control circuitry and receiving the first control signal, the first circuitry receiving the first data signal from the data processor to be transferred to a bus, the first circuitry passing the first data signal to the bus during the second portion of the period; and
   second circuitry coupled to the control circuitry and receiving the second control signal, the second circuitry receiving a second data signal from the bus and generating a second output signal coupled to the data processor, the second circuitry generating the first output signal during the third portion of the period.

6. The data processor of claim 5 wherein the first circuitry comprises:
   latching circuitry for storing the first data signal received during the first portion of the period, the latching circuitry generating a previously stored first data signal; and
   forwarding circuitry coupled to the latching circuitry, the forwarding circuitry passing a second output signal during the second portion of the period, the second output signal is a logical result of an OR function of the previously stored first control signal and the first data signal received during the second portion of the period.

7. The data synchronization system of claim 6 wherein the control circuitry further comprises circuitry for generating the second control signal, the second control signal corresponding to the third logic state during a fifth and a sixth portion of the period and to the fourth logic state during a seventh portion of the period when the ratio of N to M is a non-integer value, the sixth portion subsequent to the seventh portion, the seventh portion subsequent to the fifth portion, the fifth and sixth portions equal to one divided by the first periodic clock frequency, the sixth portion equal to $(N-2)$ divided by the first periodic clock frequency.

8. The data synchronization system of claim 5 wherein the control circuitry further comprises circuitry for generating the second control signal, the second control signal corresponding to the third logic state during a fifth and a sixth portion of the period and to the fourth logic state during a seventh portion of the period when the ratio of N to M is a non-integer value, the sixth portion subsequent to the seventh portion, the seventh portion subsequent to the fifth portion, the fifth and sixth portions equal to one divided by the first periodic clock frequency, the sixth portion equal to $(N-2)$ divided by the first periodic clock frequency.

9. A method of synchronizing data transfers between a data processor and a bus to a periodic clock signal of the data processor, the data processor operating at a first periodic clock frequency, the bus operating at a second periodic clock frequency, the first periodic clock frequency greater than the second periodic clock frequency, a ratio of the first periodic clock frequency to the second periodic clock frequency equal to a ratio of N to M in simplest form, where N and M are integers, the method comprising the steps of:
   generating a first control signal in the data processor, the first control signal characterized by a period, the period equal to a quotient of the integer N to the first periodic clock frequency, the first control signal comprising either a first or a second logic state, the first control signal corresponding to the first logic state during a first portion of the period and to the second logic state during a second portion of the period, the second portion subsequent to the first portion, the first portion equal to (N−1) divided by the first periodic clock frequency, the second portion equal to one divided by the first periodic clock frequency;

generating a second control signal in the data processor, the second control signal characterized by the period, the second control signal comprising either a third or a fourth logic state, the second control signal corresponding to the third logic state during a third portion of the period and to the fourth logic state during a fourth portion of the period, the fourth portion subsequent to the third portion, the third portion equal to one divided by the first periodic clock frequency, the fourth portion equal to (N−1) divided by the first periodic clock frequency;

generating a first data signal in the data processor;

forwarding the first data signal to the bus during the second portion of the period;

receiving a second data signal in the data processor from the bus; and forwarding the second data signal to the data processor during the third portion of the period.

10. The method of claim 9 wherein the step of forwarding the first data signal comprises the steps of:

latching the first data signal received during the first portion of the period, the step of latching generating a previously stored first data signal; and forwarding the first data signal during the second portion of the period, the first data signal is a logical result of an OR function of the previously stored first data signal and the first data signal received during the second fractional portion of the period.

11. The data processor of claim 10 wherein the step of generating the second control signal in the data processor further comprises the step of generating a second control signal, the second control signal characterized by the period, the second control signal having either the third or the fourth logic state, the second control signal corresponding to the third logic state during a fifth and a sixth portion of the period and to the fourth logic state during a seventh portion of the period when the ratio of N to M is a non-integer value, the sixth portion subsequent to the seventh portion, the seventh portion subsequent to the fifth portion, the fifth and sixth portions equal to one divided by the first periodic clock frequency, the sixth portion equal to (N−2) divided by the first periodic clock frequency.

12. The data processor of claim 9 wherein the step of generating the second control signal in the data processor further comprises the step of generating a second control signal, the second control signal characterized by the period, the second control signal having either the third or the fourth logic state, the second control signal corresponding to the third logic state during a fifth and a sixth portion of the period and to the fourth logic state during a seventh portion of the period when the ratio of N to M is a non-integer value, the sixth portion subsequent to the seventh portion, the seventh portion subsequent to the fifth portion, the fifth and sixth portions equal to one divided by the first periodic clock frequency, the sixth portion equal to (N−2) divided by the first periodic clock frequency.

* * * * *